United States Patent
Dal et al.

(10) Patent No.: US 10,113,525 B2
(45) Date of Patent: Oct. 30, 2018

(54) METHOD FOR CONTROLLING A STARTER-GENERATOR

(71) Applicant: THALES, Courbevoie (FR)

(72) Inventors: Arnaud Dal, Chatou (FR); Alain Culand, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/807,460

(22) Filed: Nov. 8, 2017

(65) Prior Publication Data

US 2018/0142662 A1    May 24, 2018

(30) Foreign Application Priority Data

Nov. 22, 2016  (FR) ..................... 16 01650

(51) Int. Cl.
| | |
|---|---|
| H02P 21/34 | (2016.01) |
| F02N 11/08 | (2006.01) |
| H02P 25/03 | (2016.01) |
| H02P 3/18 | (2006.01) |
| H02P 6/22 | (2006.01) |
| H02P 27/06 | (2006.01) |

(Continued)

(52) U.S. Cl.
CPC .......... *F02N 11/0859* (2013.01); *F02N 11/00* (2013.01); *F02N 11/087* (2013.01); *H02P 1/46* (2013.01); *H02P 3/18* (2013.01); *H02P 6/22* (2013.01); *H02P 21/34* (2016.02); *H02P 25/03* (2016.02); *H02P 27/06* (2013.01); *F02N 2011/0874* (2013.01); *F02N 2011/0896* (2013.01)

(58) Field of Classification Search
USPC ............................................. 290/31; 310/179
See application file for complete search history.

(56) References Cited

U.S. PATENT DOCUMENTS

| | | | | |
|---|---|---|---|---|
| 2,160,594 | A | * 5/1939 | Krebs | .................... H02K 19/36 307/104 |
| 6,232,691 | B1 | * 5/2001 | Anderson | ................ H02K 1/24 310/113 |

(Continued)

FOREIGN PATENT DOCUMENTS

| | | |
|---|---|---|
| EP | 2 280 162 A1 | 2/2011 |
| FR | 2 952 130 A1 | 5/2011 |

(Continued)

*Primary Examiner* — Pedro J Cuevas
(74) *Attorney, Agent, or Firm* — Baker & Hostetler LLP

(57) ABSTRACT

A method for controlling a starter-generator during a startup phase of a motor intended to be driven in rotation in a predetermined nominal direction by the starter-generator, the starter-generator comprises a stator comprising at least one polyphase stator winding and a rotor comprising at least one rotor winding coupled magnetically to the stator winding. The method comprises a step of starting up the motor, during which the polyphase stator winding and the rotor winding are supplied with electric power to start up the motor, the startup step preceded, when the motor is initially rotating in the direction opposite to the nominal direction, by a braking step, during which a current is drawn from at least one polyphase stator winding and the rotor winding is supplied with electric power.

12 Claims, 2 Drawing Sheets

(51) Int. Cl.
  *F02N 11/00* (2006.01)
  *H02P 1/46* (2006.01)

(56) References Cited

U.S. PATENT DOCUMENTS

| | | | | |
|---|---|---|---|---|
| 6,331,760 | B1* | 12/2001 | McLane, Jr. | H02K 17/30 |
| | | | | 310/179 |
| 7,400,056 | B2* | 7/2008 | McGinley | F02C 7/268 |
| | | | | 290/31 |
| 7,612,514 | B2* | 11/2009 | Anghel | H02J 4/00 |
| | | | | 318/440 |
| 7,615,892 | B2* | 11/2009 | Anghel | H02M 7/81 |
| | | | | 290/52 |
| 9,297,445 | B2* | 3/2016 | Kees | F02N 11/006 |
| 10,029,688 | B2* | 7/2018 | Khafagy | B60W 10/06 |
| 2008/0079262 | A1* | 4/2008 | McGinley | F02C 7/268 |
| | | | | 290/31 |
| 2008/0111420 | A1* | 5/2008 | Anghel | H02J 4/00 |
| | | | | 307/9.1 |
| 2008/0111421 | A1* | 5/2008 | Anghel | H02M 7/81 |
| | | | | 307/23 |
| 2009/0302788 | A1 | 12/2009 | Mitsuda et al. | |
| 2014/0130635 | A1* | 5/2014 | Kees | F02N 11/006 |
| | | | | 74/7 R |
| 2017/0267242 | A1* | 9/2017 | Khafagy | B60W 10/06 |

FOREIGN PATENT DOCUMENTS

| | | |
|---|---|---|
| JP | 2002-202035 A | 7/2002 |
| WO | 90/06016 A1 | 5/1990 |

* cited by examiner

METHOD FOR CONTROLLING A STARTER-GENERATOR

CROSS-REFERENCE TO RELATED APPLICATIONS

This application claims priority to foreign French patent application No. FR 1601650, filed on Nov. 22, 2016, the disclosure of which is incorporated by reference in its entirety.

FIELD OF THE INVENTION

The present invention relates to a method for controlling a starter-generator device for motors, or ESG (acronym for Electronic Starter Generator), and to an associated driving device.

The field of application is more particularly that of starter-generators for aeronautical propulsion engines. The invention may be applied, however, to other types of turbomachine, for example industrial turbomachines, those of helicopters, of auxiliary power units (APUs), or to any other type of motor.

BACKGROUND

A starter-generator device comprises a starter-generator, which is a reversible electrical machine.

A starter-generator is intended to be coupled mechanically to a shaft of a motor. It is able to operate in generator mode, during what is termed a generation phase, during which the motor provides motive power to the starter-generator. During this phase, the starter-generator transforms the mechanical rotational energy of the shaft of the motor into a polyphase AC electrical current intended to supply a user electrical network. The starter-generator is also able to operate in starter mode, during a startup phase, during which it transforms electrical energy that is provided thereto into a motive power intended to drive the shaft of the motor in rotation so as to start up the motor.

This type of starter-generator conventionally comprises a stator, comprising a polyphase stator winding, and a rotor, comprising a single-phase or polyphase rotor winding, that are coupled magnetically to one another. The stator winding and the rotor winding are coupled magnetically to one another. The rotor and the stator are for example the rotor and the stator of a main electrical machine in the case of a brushless starter-generator. The starter-generator is intended to be coupled mechanically to the shaft of the motor via its rotor.

In order to ensure startup of the motor, the stator winding is conventionally supplied by way of an AC current, thereby producing a rotating magnetic field in the stator. The rotor winding of the main machine is also supplied with DC current, thereby generating a magnetic field in the rotor of the starter-generator. The rotor and the shaft are then driven in rotation, and drive the shaft of the motor in rotation, thereby making it possible to start up the motor. The starter-generator then changes to generator mode when the motor has reached its idle speed. The supply for the stator and rotor windings is conventionally achieved by way of a starter regulation device, which is itself conventionally supplied by way of a power source via a DC supply bus. The motor is intended to rotate in a predetermined direction of rotation during the startup and generation phases. This direction of rotation is called the nominal direction of rotation.

APUs and aeronautical propulsion engines may comprise fins engaging with the surrounding air. The wind may then drive these engines in rotation, in the direction opposite to the nominal direction of rotation.

SUMMARY OF THE INVENTION

One aim of the invention is to provide a method for starting up the starter-generator when the motor is initially rotating in the direction opposite to the nominal direction.

To this end, one subject of the invention is a method for controlling a starter-generator during a startup phase of a motor intended to be driven in rotation in a predetermined nominal direction by the starter-generator, said starter-generator comprising a stator comprising at least one polyphase stator winding and a rotor comprising at least one rotor winding coupled magnetically to the stator winding. Advantageously, the method comprises a step of starting up the motor, during which said at least one polyphase stator winding and the rotor winding are supplied with electric power so as to start up the motor, said startup step being preceded, when the motor is initially rotating in the direction opposite to the nominal direction, by a braking step, during which a current is drawn from said at least one polyphase stator winding and the rotor winding is supplied with electric power.

The method advantageously comprises at least one of the features below, taken alone or in combination:

during the braking step, a current is drawn from the polyphase stator winding in order to supply said at least one rotor winding with electric power, the braking step is implemented as long as the motor is rotating in the reverse direction, during the braking step, the polyphase stator winding delivers a distribution power to a supply bus and a supply power Pa is drawn from the supply bus, the supply power Pa is greater than or equal to the distribution power Pd, during the braking step, the supply power Pa is used to supply the rotor winding, during the braking step, an assembly of at least one reversible stator inverter is controlled so as to draw a current from said at least one stator winding and deliver a distribution power Pd to a supply bus, and an assembly of at least one rotor inverter is controlled so as to draw, from said supply bus, what is termed a supply power Pa in order to supply the rotor winding with electric power, said supply power Pa is greater than or equal to distribution power Pd.

The invention also relates to a starter-generator device comprising a starter-generator comprising a stator comprising a polyphase stator winding and a rotor comprising at least one rotor winding coupled magnetically to the stator winding, said starter-generator being able to operate in a starter mode, in which it drives a motor in rotation in a predetermined nominal direction, said starter-generator device furthermore comprising a starter regulation device able to control the starter-generator and configured, during a startup phase, to implement a step of starting up the motor, during which it supplies the polyphase stator winding and the rotor winding with electric power so as to start up the motor, said startup step being preceded, when the motor is initially rotating in the direction opposite to the nominal direction, by a braking step, during which the starter regulation device draws a current from the stator winding and supplies the rotor winding with electric power.

Advantageously, the starter regulation device draws a current from the stator winding in order to supply the rotor winding with electric power.

Advantageously, the starter regulation device comprises an assembly of at least one reversible stator inverter that makes it possible to supply a supply bus from a current drawn from the stator winding, and an assembly of at least one rotor inverter able to supply the rotor winding with electric power from a distribution power drawn from the supply bus, said starter regulation device comprising a control device able to control said inverter assemblies, said control device being configured to control the assembly of at least one stator inverter and the assembly of at least one rotor inverter such that, during the braking step, the assembly of at least one stator inverter draws the current from the stator winding and delivers the distribution power Pd to the supply bus, and such that the assembly of at least one rotor inverter draws, from said supply bus, what is termed a supply power Pa in order to supply the rotor winding with electric power.

Advantageously, said supply power Pa is greater than or equal to the distribution power Pd.

BRIEF DESCRIPTION OF THE DRAWINGS

Other features and advantages of the invention will become apparent on reading the detailed description that follows, given by way of non-limiting example and with reference to the appended drawings, in which.

From one figure to another, the same elements bear the same references.

DETAILED DESCRIPTION

Figure 1:
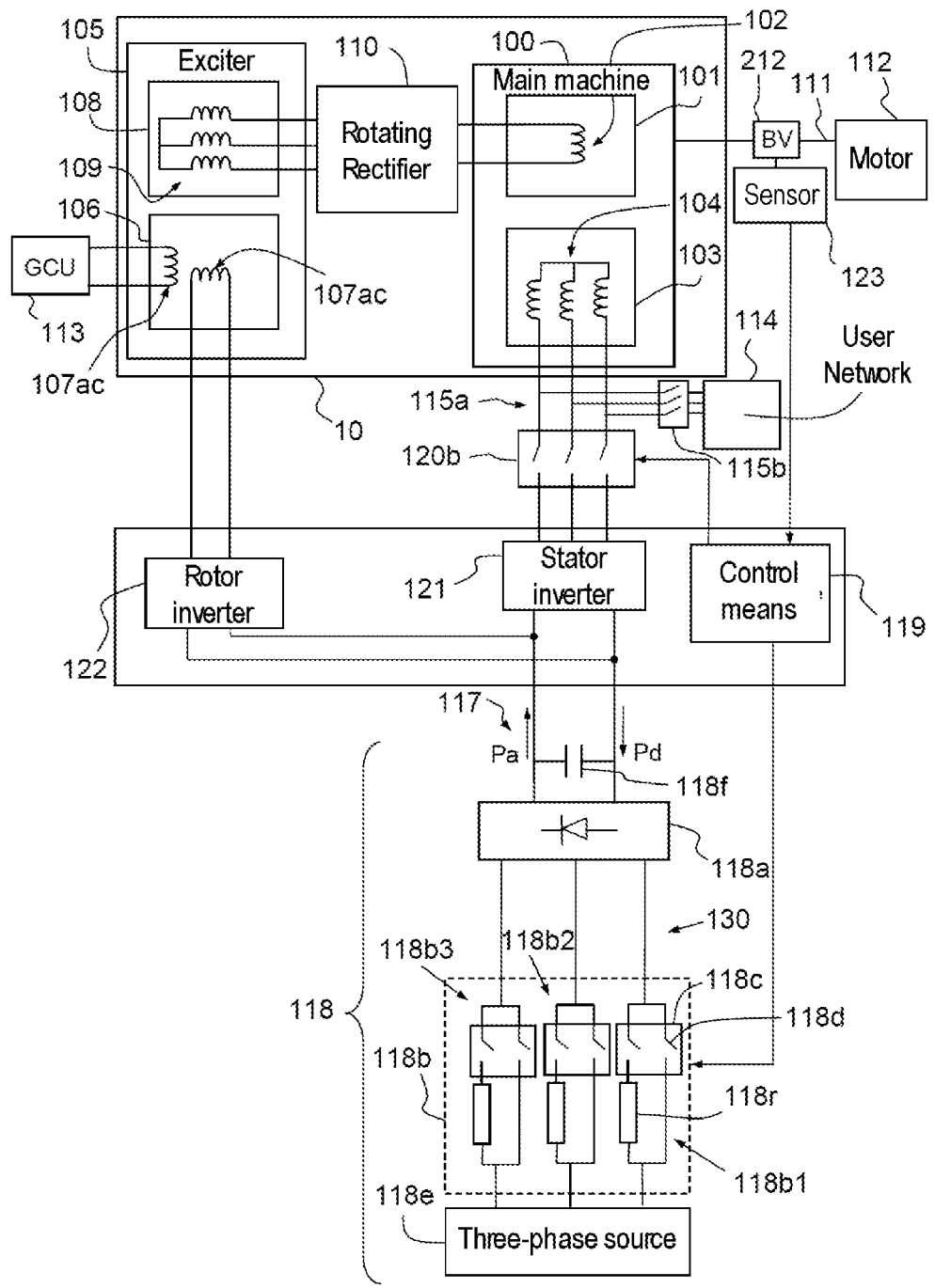
FIG. 1, already described, shows a functional diagram of a starter-generator device according to the invention.

The starter-generator device 1 according to the invention is shown functionally in FIG. 1. This starter-generator device is intended to start up a motor 112, during a startup phase, and to be driven by the motor and deliver a polyphase AC voltage during a generation phase. The starter-generator device 1 according to the invention comprises a starter-generator 10. This starter-generator 10 is of two-stage brushless synchronous electrical machine type in the non-limiting example of FIG. 1. The starter-generator 10 is advantageously coupled mechanically to the motor 112 via a gearbox BV, 212. This synchronous electrical machine 10 comprises a main machine 100 comprising a main rotor 101 and a main stator 103 that are coupled magnetically to one another.

As is visible in FIG. 1, the main rotor 101 comprises at least one rotor winding 102 and the main stator comprises a polyphase stator winding 104, called stator winding 104 in the remainder of the text. The polyphase stator winding 104 comprises a plurality of stator phase windings that are offset angularly so as to deliver a polyphase AC voltage.

The starter-generator is for example, in a non-limiting manner, a brushless synchronous starter-generator as shown in FIG. 1. Brushless synchronous starter-generators conventionally comprise an exciter 105. The exciter comprises an exciter stator 106 comprising at least one exciter stator winding, in this case two stator windings 107ac and 107dc, and an exciter rotor 108 comprising a polyphase winding 109 linked electrically to the rotor winding 102 of the main machine 100 by way of a rotating bridge rectifier 110. The rotors 101, 108 of the main machine 100 and of the exciter 105 are mounted on a common shaft 111 intended to be coupled to a motor 112.

When the starter-generator 10 operates in generator mode, a DC current is injected into a first stator winding 107dc of the exciter. If the rotor of the exciter 105 rotates, a polyphase AC current is induced in the rotor of the exciter 108. The rotating bridge rectifier 110 rectifies this current, and the DC current IF obtained is injected into the rotor winding 102 of the main machine 100. As the rotor of the main machine 100 is driven in rotation by the motor, a polyphase AC current is induced in the polyphase stator winding 104 of the main machine 100 and is intended to supply a user network 114 via a generation contactor 115. A generation control unit GCU, 113 supplies the first stator winding 107dc of the exciter during the generation phase. The unit GCU, 113 advantageously regulates the supply current and/or voltage of the first winding 107dc so as to regulate the AC voltage provided by the stator winding 104.

When the starter-generator 10 operates in starter mode, the rotor winding 102 and the stator winding 104 are supplied with electric power by way of a starter regulation device 116. The rotor winding 102 is, for example, supplied through the injection of a current into the second stator winding 107ac by the starter regulation device 116. This AC current induces, through the transformer effect, an electromagnetic field in the rotor 108 of the exciter 105, whether the exciter is rotating or not. The AC current generated by this induced electromagnetic field is rectified by the rotating bridge rectifier 110, and the DC current IF thus obtained is injected into the rotor winding 102 of the main machine 100, thereby generating a magnetic field in the rotor 101 of the main machine 100. The polyphase stator winding 104 of the main machine 100 is supplied with variable-frequency polyphase AC current. This current produces a rotating magnetic field in the main stator 103. The interaction between the magnetic field created by the winding of the rotor 102 and the rotating field created by the windings of the stator 104 creates a motor electromagnetic torque. The main rotor 101 and the shaft 111 are then driven in rotation and drive the motor 112 in rotation. The starter-generator then changes to generator mode when the motor has reached its idle speed.

The starter regulation device 116 is supplied by way of a power source 118. The power source 118 delivers a DC current, via a DC supply bus 117, in the non-limiting example of FIG. 1. The power source 118 is, for example, an APU or a ground generator set. The power source may comprise a DC current power source or an AC current power source and a rectifier. The starter regulation device 116 is advantageously able to regulate the supply voltage and/or currents of the stator and rotor windings 104 and 102. To this end, information relating to the instantaneous values of the supply voltage and/or currents of these windings is provided to the starter regulation device 116. These values are advantageously provided to a control device 119.

The starter regulation device 116 comprises, in a non-limiting manner, an assembly of at least one so-called stator inverter 121 linked electrically to the supply bus 117 and to the stator winding 104. It makes it possible to supply the stator winding 104 with electric power by way of a current drawn from a supply bus 117.

The starter regulation device 116 comprises, in a non-limiting manner, an assembly of at least one other so-called rotor inverter 122 linked electrically to the supply bus 117 and to the rotor winding 102. It makes it possible to supply the rotor winding 102 with electric power by way of a current drawn from the supply bus 117.

In the non-limiting implementation of FIG. 1, each assembly of at least one inverter comprises a single inverter 121, 122, but may comprise a plurality thereof as a variant.

The inverters 121, 122 of the starter regulation device 116 are controlled by the control device 119.

The assembly of at least one stator inverter 121 is linked to the stator winding 104 via a supply line 120a comprising a startup contactor 120b. In the embodiment of FIG. 1, the starter-generator device comprises one startup contactor, but it could comprise a plurality thereof, in particular when the starter regulation device comprises a plurality of stator inverters, for example when the main stator comprises a plurality of polyphase stator windings. Each stator inverter is then linked to a polyphase stator winding by way of a polyphase supply line comprising a startup contactor.

The startup contactor 120b may advantageously be controlled by way of the control device 119. The control device 119 is advantageously configured to control the startup contactor 120b so as to close the supply line 115a upon reception of a startup order. This makes it possible to supply the polyphase stator winding 104 with electric power by way of the assembly of at least one stator inverter 121 so as to make the starter-generator operate in starter mode. The control device 119 is advantageously configured to open the supply line 120a so as to disconnect the assembly of at least the stator winding 104 upon reception of a generation order.

The polyphase stator winding 104 is linked electrically to a user network 114 so as to supply the user network 114 with electric power by way of the starter-generator 10 when the starter-generator is put into generator mode.

The polyphase stator winding 104 is for example linked to a user network 114 by way of at least one supply line 115a comprising at least one generation contactor. The generation contactor 115b may advantageously be controlled by way of the control device 119. The control device 119 is advantageously configured to control the startup contactor 120b so as to close the supply line 115a upon reception of a generation order. The control device 119 is advantageously configured to open the supply line 115a so as to disconnect the assembly of at least one stator phase winding 104 upon reception of a generation order.

Figure 2:
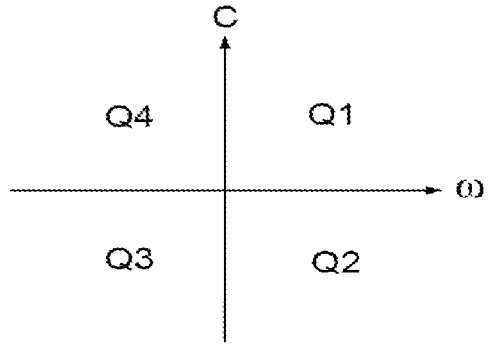
FIG. 2 shows a torque C (N·m)—angular velocity ω in rad·s$^{-1}$—plane of a starter-generator of a starter-generator device according to the invention.

It should be recalled that the torque C (N·m)/angular velocity ω (rad·s$^{-1}$) plane of the starter-generator device is divided into four quadrants Q1, Q2, Q3, Q4 as shown in FIG. 2, including two motor quadrants Q1 and Q3 and two generator quadrants Q2 and Q4. Only one of the motor quadrants, the first quadrant Q1, is able to be used in the context of this invention, as the motor 112 is intended to rotate in a predetermined direction when the starter-generator 10 operates in starter mode. As a result, the motor quadrant opposite the first quadrant Q1, namely the third quadrant Q3, is not able to be used to start up this motor. In the same way, only one of the generator quadrants, the second quadrant Q2, is able to be used in the context of this invention, as the motor 112 is intended to rotate in a predetermined direction when the starter-generator 10 operates in generator mode. As a result, the generator quadrant Q4 opposite the second quadrant Q2 is not able to be used to start up this motor 112.

When the wind makes the motor 112 rotate in the direction opposite to the nominal direction, the starter-generator 10 is then in the fourth quadrant Q4, which is a generation quadrant. As the product of the torque and the angular velocity is negative in this fourth quadrant, the starter-generator is incapable of providing a motor torque and therefore of starting up the motor 112 in the nominal direction. It is not possible to start up the motor 112 directly. Now, as the motor 112 provides a motor torque, if the rotor winding 102 is supplied with electric power, as the rotor 101 is driven in rotation by the motor 112, a polyphase AC current is induced in the polyphase stator winding 104 of the main machine 100. The starter-generator device 1 may (only) provide a braking torque through the absorption of a power, delivered by the stator winding 104, by the starter regulation device 116.

Advantageously, when the control device 119 receives a startup order while the motor 112 is rotating in the direction opposite to the nominal direction, the starter regulation device 116 is configured not to directly implement a startup step during which it puts the starter-generator 10 into starter mode, that is to say during which it supplies the stator and rotor windings 104 and 102 of the main machine 100 with electric power.

Advantageously, the starter regulation device 116 is configured to put the starter-generator 10 into the startup phase, for example upon reception of a startup command, so as to implement a braking step 203 before the startup step 204. During the braking step, the starter regulation device 116 draws a power from the stator winding 104 and supplies the rotor winding 102 with electric power. The braking step 203 makes it possible to brake the motor, which is rotating in the reverse direction.

When the speed of the motor 112 reaches zero, it is possible to start up the motor. The braking step 203 makes it possible to make the motor 112 available for the startup more quickly, and thus to limit the period of unavailability of an item of equipment, for example an aircraft, driven by the motor.

The control device 119 controls the inverters in a coordinated manner during the braking step. More precisely, the control device controls the rotor inverter 122 so that it supplies the rotor winding with electric power and the stator inverter 121 so that it draws a current from the stator winding. The stator inverter 121 is therefore reversible. Advantageously, the stator inverter 121 is driven in such a way as to control the braking torque.

The braking step may be implemented using a starter regulation device of the type of FIG. 1, in which the inverters are linked to one and the same supply bus 117, the inverters 121, 122 being able to supply the stator and rotor windings from a current drawn from the supply bus 117, or using any other type of starter regulation device, for example a device comprising two inverters that are able to supply the stator and rotor windings with electric power and to draw a current from the stator winding and that are linked electrically to different supply buses, or a device comprising a rotor inverter able to supply the rotor winding with electric power and an AC-to-AC converter able to draw a current from the stator winding, or of the type comprising an AC-to-DC converter able to draw a current from the stator winding and linked electrically to one and the same supply bus as the rotor inverter and comprising another DC-to-AC or AC-to-AC converter able to supply the stator winding 104 with electric power and linked to a different supply bus than the rotor inverter.

Advantageously, the braking step 204 is implemented as long as the motor 112 is rotating in the reverse direction.

In order to detect whether the motor is rotating in the reverse direction, the control device 119 advantageously uses information on the angular velocity ω of the rotor. This information on the angular velocity of the rotor may be provided by an angular velocity sensor 123. As a variant, the starter-generator device 1 comprises a sensor that makes it possible to measure an angular position of the rotor and to provide this to the control device. The control device comprises means that make it possible to calculate an angular velocity of the rotor on the basis of the angular position.

During the braking step 203, the stator inverter 121 delivers a voltage to the supply bus 117. In other words, during the braking step, the polyphase stator winding delivers a distribution power to a supply bus.

The greater the power absorbed on the stator inverter, the faster the braking and the shorter the period of unavailability of the item of equipment powered by way of the motor 112. Now, if the electric power delivered by the starter regulation device 116 to the supply bus 117 is greater than the power consumed on the bus 117, the bus voltage increases, thereby possibly leading to the deterioration of the starter regulation device or to the activation of overvoltage protection means, which may make the starter-generator unavailable as long as the motor is rotating in the reverse direction or, more precisely, as long as the voltage has not fallen back below the threshold.

The solution provided consists, during the braking step, in drawing, from the supply bus 117, a supply power Pa. This is performed in order to prevent an excessively large voltage increase on the supply bus 117 caused by the injection of the distribution power Pd on the bus 117.

Advantageously, the supply power Pa is greater than or equal to what is termed the distribution power Pd that is delivered to the supply bus 117 by the stator winding 104. This is implemented in order to prevent a voltage increase on the supply bus 117 caused by the injection of the distribution power Pd on the bus 117.

The supply power is taken up by a load.

Advantageously, the load is the rotor winding 102. In other words, during the braking step, a current is drawn from the polyphase stator winding in order to supply said at least one rotor winding with electric power.

Advantageously, the power Pa is used to supply the rotor winding.

Advantageously, the invention then consists in drawing all of the distribution power Pd, delivered to the supply bus 117 by the stator winding 104, in order to supply the rotor winding 102. As long as the power drawn from the supply bus 117 is greater than the power delivered by the stator winding 104 to the supply bus 117, there cannot be an increase in the voltage on the supply bus 117 caused by the injection of the power Pd on the supply bus.

To this end, the starter regulation device 116 is configured so as to draw all of the distribution power Pd delivered to the supply bus 117 and to use the power drawn to supply the rotor winding 102. In other words, the power drawn is injected into the starter-generator 10 so as to supply the rotor winding 102.

For information purposes, the power to be supplied to the stator winding of the exciter in order to supply the rotor winding of the main machine may reach several kW.

The invention makes it possible to avoid the risks of deterioration of the starter regulation device 116, more particularly of its inverters, or the tripping of overvoltage protection devices during the startup phase. It also makes it possible to draw a greater power from the stator winding 104 without the risk of an overvoltage on the supply bus 117, thereby making it possible to increase the speed of the braking and to limit the unavailability of the item of equipment powered by way of the motor 112, that is to say for example to limit the downtime of an aircraft caused by wind. The invention is simple and optimal, since it uses a load (rotor winding 102) that is in fact supplied with electric power during the braking step. The invention does not use any other load, thereby making it possible to avoid having to implement driving specific to this other load. It is particularly suitable for a starter-generator device 1 of the type comprising a rotor inverter linked electrically to the same supply bus as the stator inverter. It also applies to any type of inverter comprising a converter able to draw a current from the stator winding 104 and to deliver this current to a supply bus 117 linked to the rotor inverter 122 such that the rotor inverter is able to supply the rotor winding 102.

Once the motor 112 has been braked sufficiently to return to a zero and then positive speed, it is no longer necessary to limit the power provided, this time, to the stator winding 104 of the main machine 100 with respect to the power provided to the stator winding 107ac of the exciter 105 in order to supply the rotor winding 102 of the main machine.

In the embodiment of FIG. 1, the control device 119 is configured in such a way as to control the stator inverter 121 so as to draw a current from the stator winding 104 and to deliver a distribution power Pd to the bus 117 and in such a way as to control the rotor inverter 122 such that it draws, from the supply bus 117, a supply power Pa, greater than or equal to the distribution power Pd, in order to supply the rotor winding 102. In other words, the rotor inverter 122 comprises an input linked to the supply bus 117 and an output linked to the starter-generator 10 in order to make it possible to supply the rotor winding 102 with electric power. This inverter 22 transforms the electric supply power Pa that it draws from the bus 117 into a power that is injected into the starter-generator 10, so as to supply the rotor winding 102 with electric power. In the example of FIG. 1, the rotor inverter 122 supplies the rotor winding 102 via the exciter 105.

In other words, the supply power Pa drawn from the supply bus 117 is transformed by the rotor inverter 122 into an electric power that is delivered by the rotor inverter 122 and drawn by the starter-generator 10 in order to supply the rotor winding 102.

In a less optimal variant, the load comprises the rotor winding 102 and another load.

In order to control the inverters 121, 122 such that the supply power Pa is greater than the delivered power Pd, the starter-generator device 10 comprises for example a memory containing a table of currents comprising for example the value of the supply current of the stator winding 104, which value is not to be exceeded in relation to the rotor current, which is for example the current delivered by the rotor inverter in order to supply the rotor.

During the braking step 203, the control device 119 generates or receives a torque setpoint value, receives or generates a rotor current setpoint value that has to be delivered by the rotor inverter 122, and receives information on the position and/or speed of the rotor 101. It controls the inverters 121, 122 in terms of current in order to servo-control the torque delivered by the starter-generator 10 to the torque setpoint value depending on the information on the position and/or speed of the rotor, while observing the rotor current setpoint value and while limiting the stator current delivered by the stator winding 104 to the maximum value provided by the current table in relation to the rotor current setpoint value.

The rotor current setpoint value may be set during the braking step; this is for example the maximum rotor current that the rotor current must not exceed during the braking step. As a variant, the current setpoint value is variable during the braking step.

The current table is obtained for example in the following manner, but it could be obtained using more accurate methods. The power P delivered by the rotor inverter is:

$$P=R*Ir^2$$

Where R is the impedance of the machine supplied by the rotor inverter and returned to the input of the rotor inverter 122, and Ir is the current at the output of the rotor inverter 122 or an estimation of the current in the rotor winding of the main electrical machine, which estimation is able to be obtained on the basis of the current delivered by the rotor current at the output of the rotor inverter.

The supply power Pa drawn from the supply bus is then:

$$Pa=P/Rr$$

Where Rr is the output of the rotor inverter.

The power Pd delivered to the bus 117 by the rotor winding is:

$$Pd=(C\omega/Rs*Rm)$$

Where C is the torque delivered by the starter-generator in N·m

ω is the rotational speed or angular velocity of the shaft in rad·s$^{-1}$

Rs is the output of the stator inverter

Rm is the output of the starter-generator

By calculating the power delivered for the predetermined speed, an approximation of the first order is obtained:

$$Pd=K*Is*Ir/(Rr*Rs)$$

Where K is a known constant and Is is the current delivered by the stator inverter 121.

As the power delivered to the bus Pd must be lower than or equal to the supply power Pa absorbed on the bus, the maximum delivered power Pdmax is given by:

$$Pdmax=K*Ir*Ismax/(Rr*Rs)=RIr^2/Rr$$

Where Ismax is the maximum stator current acceptable during the braking step depending on the rotor current Ir:

$$Ismax=R*Ir*Rs/K$$

Figure 3:
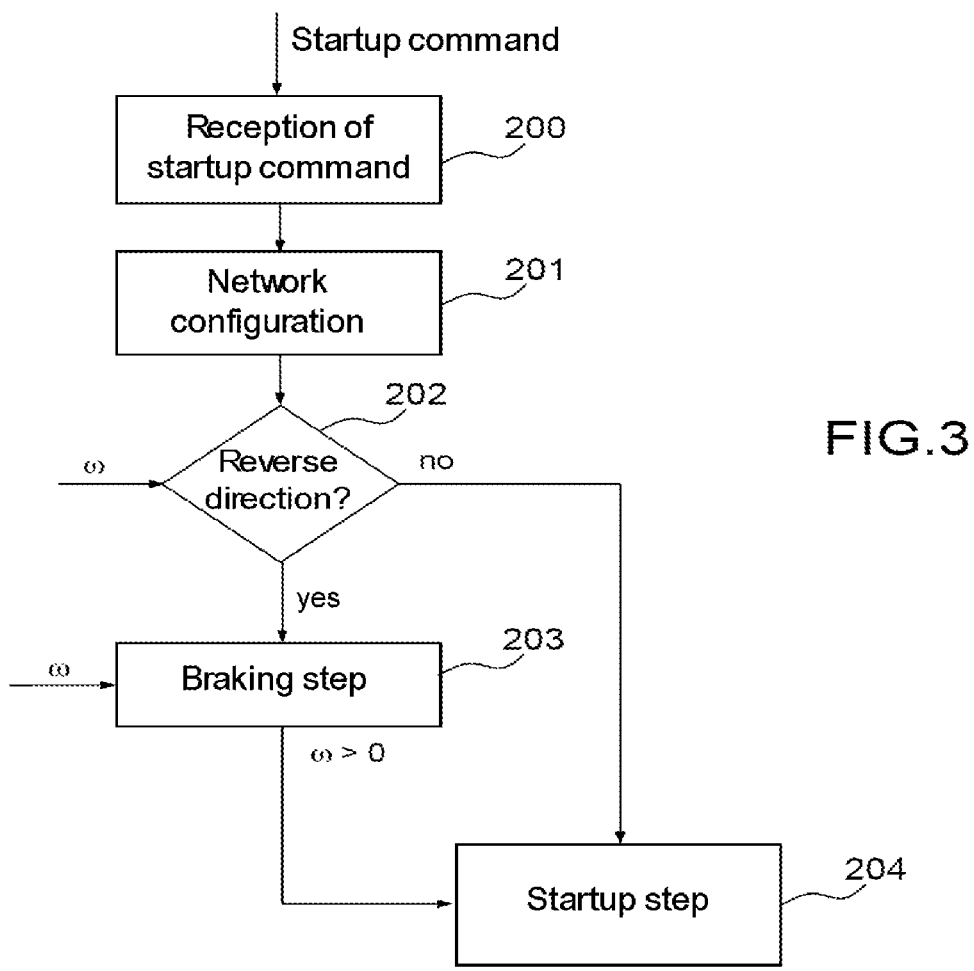
FIG. 3 shows the steps of the method according to the invention.

The invention also relates to a method for controlling a starter-generator 10 such as described previously during a startup phase. The steps of the method are shown in FIG. 3.

The startup phase advantageously begins after reception 200, by the control device, of a startup command.

After reception 200 of the startup command, the method advantageously, but not necessarily, comprises a step 201 of configuring the electrical network, comprising a step of closing the startup contactor 120b and a step of opening the generation contactor 115b. In the non-limiting example of FIG. 1, the power source 118 that makes it possible to deliver a DC current comprises a three-phase power source 118e that makes it possible to deliver a three-phase current and that is linked to a rectifier 118a that makes it possible to rectify the current delivered by the source 118e and to deliver a DC current that is injected into the stator inverter 121 via a capacitor 118f that makes it possible to smooth the voltage at the output of the rectifier 118a. The rectifier 118a is linked to the three-phase source 118e by a three-phase supply line 130 comprising a startup switch circuit or device 118b. This device comprises three individual startup switch circuits or devices 118b1, 118b2, 118b3 that are integrated into the respective lines of the three-phase supply line 130. These individual devices 118b1, 118b2, 118b3 may be identical, as in FIG. 1. Each individual device comprises two branches in parallel, one of which comprises a first switch 118c and another of which comprises a second switch 118d in series with a resistor 118r. Advantageously, the control device 119 is configured to drive the switches 118c, 118d in such a way as to close the supply line 130 in the startup phase, for example during the step 201 of configuring the network. The second switch 118d is closed before the first switch 118c in order to limit current draw. The rectifier 118a is for example a diode bridge or an auto-transformer rectifier unit (ATRU).

The method comprises a checking step 202, advantageously performed by the control device 119, consisting in checking whether the motor 112 is rotating in a reverse direction. This is for example performed on the basis of information on the position and/or speeds of the rotor of the starter-generator or of the motor, said information being received by the control device 119 and delivered by a speed and/or position sensor 123.

The method according to the invention comprises a step 204 of starting up the motor, during which said at least one polyphase stator winding 104 and the rotor winding 102 are supplied with electric power so as to start up the motor 112, said startup step being preceded, when the motor 112 is initially rotating in the direction opposite to the nominal direction, by a braking step 203 during which a current is drawn from said at least one polyphase stator winding 104.

Advantageously, when the motor 112 is not initially rotating in the reverse direction, the method does not comprise the braking step 203.

The braking step 203 is advantageously implemented as long as the motor 112 is rotating in the reverse direction.

The braking step 203 is not necessarily implemented as long as the motor 112 is rotating in the reverse direction. It may, for example, be implemented until the speed, of the motor rotating in the reverse direction, reaches a predetermined threshold.

The motor may be a turbomachine or any other type of motor.

Each rotor or stator mentioned in the present patent application comprises, as is conventional, an armature that is not referenced and on which the winding(s) of the rotor or stator is/are wound. The structure is made of solid or laminated ferromagnetic material, forming a permanent magnet. The windings are made of electrically conductive material, for example of metal, for example of copper.

In the example shown in FIG. 1, the stator 106 of the exciter 105 comprises two stator windings 107ac and 107dc, one of which is supplied with electric power during the startup phase and the other during the generation phase.

As a variant, the stator 106 of the exciter 105 comprises a single stator winding. This winding is then supplied with DC current during the generation phase, for example by way of the GCU, and with AC current during the startup phase, by way of the starter regulation device 116.

In the example shown in FIG. 1, the starter-generator according to the invention is two-stage (exciter and main machine). As a variant, the starter-generator according to the invention is three-stage.

In the non-limiting implementation of the figures, the starter-generator is of brushless type. As a variant, the starter-generator comprises brushes. It comprises for example a rotating collector for creating an electrical connection between the rotor winding and the rotor inverter.

The control device 119 may comprise one or more dedicated electronic circuits or a general-purpose circuit. Each electronic circuit may comprise a reprogram mable computing machine (a processor or a microcontroller for example) and/or a computer executing a program comprising a sequence of instructions and/or a dedicated computing machine (for example a set of logic gates such as an FPGA, a DSP or an ASIC, or any other hardware module). The starter-generator may also comprise at least one power supply for supplying the control means.

The invention claimed is:

1. A method for controlling a starter-generator during a startup phase of a motor intended to be driven in rotation in a predetermined nominal direction by the starter-generator, said starter-generator comprising a stator comprising at least one polyphase stator winding and a rotor comprising at least one rotor winding coupled magnetically to the stator winding,
comprising a step of starting up the motor, during which said at least one polyphase stator winding and said at least one rotor winding are supplied with electric power so as to start up the motor, said startup step being preceded, when the motor is initially rotating in the direction opposite to the nominal direction, by a braking step, during which a current is drawn from said at least one polyphase stator winding and said at least one rotor winding is supplied with electric power.

2. The control method according to the claim 1, wherein, during the braking step, a current is drawn from the polyphase stator winding in order to supply said at least one rotor winding with electric power.

3. The control method according to claim 1, wherein the braking step is implemented as long as the motor is rotating in the reverse direction.

4. The control method according to claim 1, wherein, during the braking step, the polyphase stator winding delivers a distribution power (Pd) to a supply bus and a supply power is drawn from the supply bus.

5. The control method according to claim 4, wherein the supply power Pa is greater than or equal to the distribution power Pd.

6. The control method according to claim 4, wherein, during the braking step, the supply power Pa is used to supply the rotor winding.

7. The control method according to claim 1, wherein, during the braking step, an assembly of at least one reversible stator inverter is controlled so as to draw a current from said at least one stator winding and deliver a distribution power Pd to a supply bus, and an assembly of at least one rotor inverter is controlled so as to draw, from said supply bus, what is termed a supply power Pa in order to supply said at least one rotor winding with electric power.

8. The control method according to claim 7, wherein said supply power Pa is greater than or equal to the distribution power Pd.

9. A starter-generator device comprising a starter-generator comprising a stator comprising a polyphase stator winding and a rotor comprising at least one rotor winding coupled magnetically to the stator winding, said starter-generator being able to operate in a starter mode, wherein it drives a motor in rotation in a predetermined nominal direction, said starter-generator device furthermore comprising a starter regulation device able to control the starter-generator and configured, during a startup phase, to implement a step of starting up the motor, during which it supplies the polyphase stator winding and the rotor winding with electric power so as to start up the motor, said startup step being preceded, when the motor is initially rotating in the direction opposite to the nominal direction, by a braking step, during which the starter regulation device draws a current from the stator winding and supplies the rotor winding with electric power.

10. The starter-generator device according to claim 9, wherein, during the braking step, the starter regulation device draws a current from the stator winding in order to supply the rotor winding with electric power.

11. The starter-generator device according to claim 10, wherein the starter regulation device comprises an assembly of at least one reversible stator inverter that makes it possible to supply a supply bus from a current drawn from the stator winding, and an assembly of at least one rotor inverter able to supply the rotor winding with electric power from a distribution power drawn from the supply bus, said starter regulation device comprising a control device able to control said inverter assemblies, said control device being configured to control the assembly of at least one stator inverter and the assembly of at least one rotor inverter such that, during the braking step, the assembly of at least one stator inverter draws the current from the stator winding and delivers the distribution power Pd to the supply bus, and such that the assembly of at least one rotor inverter draws, from said supply bus, what is termed a supply power Pa in order to supply the rotor winding with electric power.

12. The starter-generator device according to claim 11, wherein the supply power Pa is greater than or equal to the distribution power Pd.

* * * * *